United States Patent [19]

Thelen et al.

[11] Patent Number: 4,960,296
[45] Date of Patent: Oct. 2, 1990

[54] GALVANIC ISOLATOR CONDUIT FITTING

[75] Inventors: William G. Thelen, Onondaga, Mich.; Rodney E. May, Ohio City; David L. Gilbert, Paulding, both of Ohio

[73] Assignee: Aeroquip Corporation, Jackson, Mich.

[21] Appl. No.: 405,774

[22] Filed: Sep. 11, 1989

[51] Int. Cl.$^5$ ............................................. F16L 55/00
[52] U.S. Cl. ..................................... 285/50; 285/179; 285/906
[58] Field of Search ........................... 285/50, 179, 906

[56] References Cited

U.S. PATENT DOCUMENTS 2,485,408 10/1949 Pezzillo ............................. 285/502

FOREIGN PATENT DOCUMENTS

| 101531 | 7/1937 | Australia | 285/50 |
| 254721 | 8/1963 | Australia | 285/50 |
| 1303240 | 1/1973 | United Kingdom | 285/50 |

Primary Examiner—Dave W. Arola
Attorney, Agent, or Firm—Beaman & Beaman

[57] ABSTRACT

A conduit fitting for use in conduit systems having attachment structure at each end which is galvanically isolated from each other to prevent galvanic corrosion and deterioration. The fitting components are assembled to constitute a unit to facilitate handling and inventory.

3 Claims, 2 Drawing Sheets

GALVANIC ISOLATOR CONDUIT FITTING

BACKGROUND OF THE INVENTION

Conduit systems, particularly those used to conduct seawater as used on watercraft, including submarines, are subject to galvanic corrosion due to the use of dissimilar metals in the system. Galvanic corrosion in seawater conduit systems is controlled, and substantially eliminated, by the use of dielectric isolators which interrupt the electrical continuity between conduit system components.

However, conduit systems employing galvanic isolators which are presently available employ a plurality of "loose" and unassociated components which require assembly during installation of the system. Such use of a number of small components is troublesome, creates inventory problems due to the number of parts required, and introduces the possibility of incorrectly assembling galvanic isolator fittings which would permit failure, and possible catastrophic results.

It is an object of the invention to provide a galvanic isolator conduit fitting which is of relatively simple and economic construction and wherein the fitting assembly is unitary with respect to shipping and inventory purposes.

A further object of the invention is to provide a galvanic isolator conduit fitting utilizing conduit attachment means at the opposite ends of a body and a dielectric isolator insulates at least one of the attachments means from the fitting body.

Yet another object of the invention is to provide a galvanic isolator conduit fitting wherein conduit attachment means are located at each end of a conduit body and the attachment means at one end of the body is rotatably adjustable with respect to the remainder of the body to permit alignment of bolt holes, and other misalignment problems that may exist.

An additional object of the invention is to provide a galvanic isolator conduit fitting employing a dielectric elastomer to interrupt electrical conductivity, the elastimer being bonded to its support component.

In the practice of the invention a conduit fitting includes a body having attachment ends located at each body end. The ends may include flanges or other attachment structure wherein the fitting may be incorporated into a conduit system.

One of the attachment ends is connected to a body end through a thin elastomeric shield or boot which encompasses an outwardly radially extending shoulder defined on the associated fitting end. The associated attachment end includes structure for associating with the elastomer encompassed shoulder and mechanical means associated with the attachment end supports the attachment end on the body in an electrically insulated relationship. The attachment means and the associated elastomer encompassed shoulder are configured to constitute a unitary assembly wherein shipping and inventorying the fitting maintains all of the required fitting components together as a unit in preparation for installation.

In an embodiment of the invention a fitting attachment end associated with the elastomer includes a bearing mounted upon the elastomer to permit rotative adjustment of the attachment end relative to the associated fitting body end for alignment and assembly purposes.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figures 1, 2:
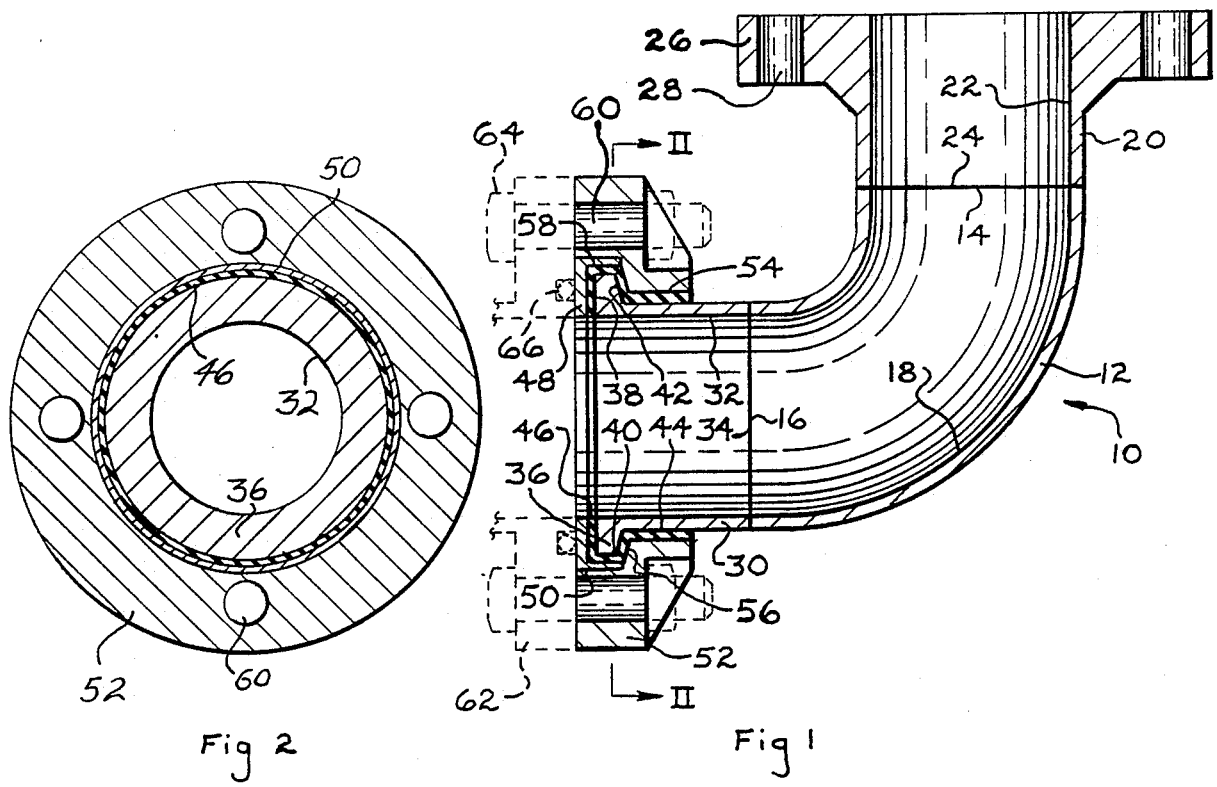
FIG. 1 is an elevational, diametrical sectional view of an elbow conduit fitting in accord with the invention.
FIG. 2 is an elevational sectional view taken along Section II—II of FIG. 1.

A basic version of a galvanic isolator conduit fitting utilizing the concepts of the invention is shown in FIGS. 1 and 2. The overall fitting 10 includes a body 12, which, in the disclosed embodiment, constitutes a 90° elbow. The body 10 includes flat ends 14 and 16 and an internal passage 18. At its upper end as shown in FIG. 1, the fitting 10 includes attachment end 20 having a passage 22 which aligns with passage 18, and the attachment end 20 includes a flat end 24 which engages the body end 14 and at this junction the body 12 and attachment end 20 are welded together in a fluid tight relationship.

The attachment end 20 includes a radial flange 26 having a plurality of bolt holes 28 defined therein whereby bolts may be used to attach the flange 26 to the flange of the adjacent conduit fitting, not shown.

The other fitting attachment end 30 includes a passage 32 which is aligned with body passage 18 at end 34 which engages the body end 16 and the attachment end 30 is welded to the body 12 at the junction of end edges 16 and 34. The attachment end 30 includes a radially outwardly extending shoulder 36 which is defined by a radial end surface 38 perpendicular to the axis of the passage 32. The shoulder 36 also includes a generally cylindrical peripheral surface 40 and an oblique inner surface 42 intersects the periphery 40 defining the third surface of the shoulder. The attachment end exterior surface 44 adjacent the shoulder 36 is cylindrical.

Galvanic isolation is achieved by the dielectric rubber elastomer 46 which is of a configuration complementary to surfaces 38, 40, 42 and 44, and the elastomer is bonded to these attachment end surfaces in an intregal manner. The elastomer 46 may be formed of rubber or rubber-like materials, or epoxy or polyethylene.

A face plate 48 of an annular configuration is bonded to the radial portion of the elastomer engaging shoulder surface 38, and the face plate also includes a cylindrical axially extending portion 50 overlying the elastomer engaging the shoulder periphery 40 to which it is bonded.

An annular mounting flange 52 encircles the shoulder 36, elastomer 46 and face plate 48, and the mounting flange 52 includes a central recess which is defined by the cylindrical axially extending surface 54, the oblique radially disposed surface 56 and the cylindrical surface 58 which engages the face plate periphery 50. Together, the surfaces 54, 56 and 58 define a concentric recess within the mounting flange 52. The elastomer 46 is also bonded to surfaces 54, 56 and 58.

The mounting flange 52 is provided with a plurality of bolt holes 60 whereby the adjacent conduit fitting shown in dotted lines which includes a flange 62 may be attached to the mounting flange by bolts 64. The adjacent fitting flange shown in dotted lines includes a recess receiving O-ring 66 which engages the face place 48 in a sealed relationship.

In the construction of the fitting 10, the attachment end 20 is welded to the body end 14 and the attachment end 30 is welded to body end 16. To prevent the heat of the welding from adversely affecting the bonding of the elastomer 46 to its contiguous surfaces the metal welding occurs before the elastomer bonding takes place.

The above described assembly sequence assures that the mounting flange 52 will be firmly mounted upon the body 12 and the elastomer 46 and face plate 48 will all be in place. The fact that the diameter of shoulder 36 is greater than the diameter of surface 54 makes the assembly "fail safe", and the elastomer is preferably loaded under compression to insure against structural failure even if the bonding fails. Also, the elastomer limits leakage as it will function as a gasket. Thus, the assembly shown in full lines in FIG. 1 constitutes a unitary galvanic isolator conduit fitting which may be packaged and inventoried as a unit.

It will be readily appreciated from FIGS. 1 and 2 that attachment of the mounting flange 52 to the associated conduit fitting flange by means of bolts 64 will produce an electrical isolation between the mounting flange 52 and the body 12 preventing electrical or galvanic flow between the mounting flange 52 and the flange 26. The construction provides a high strength, low cost, concise fitting capable of effective galvanic isolation.

Figures 3, 4:
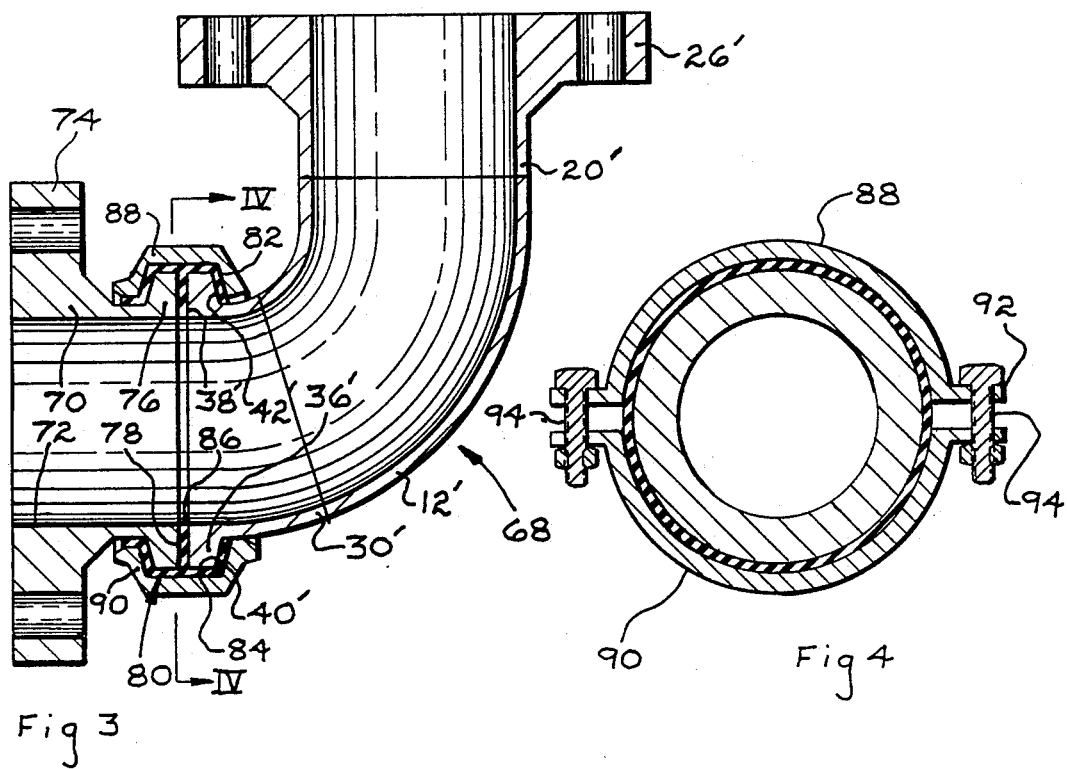
FIG. 3 is an elevational, diametrical sectional view of another embodiment of a conduit fitting incorporating the concepts of the invention.
FIG. 4 is an elevational sectional view taken along Section IV—IV of FIG. 3.

A variation of the concept of the invention is shown in the fitting illustrated in FIGS. 3 and 4 wherein components similar to those previously described are indicated by primed reference numerals.

In this embodiment the fitting 58 includes a body 12' having an attachment end 20' welded thereto which includes flange 26'. At its other end, the fitting body 12' includes the attachment end 30' having a shoulder 36' defined by surfaces 38' 40' and 42' similar to those previously described.

The mounting flange 70 includes a bore 72 which aligns with the passage of the attachment end 30' and the radial flange extension 74 includes bolt holes for attachment of the fitting to a typical conduit fitting of similar configuration, not shown.

The mounting flange 70 also includes a collar or shoulder 76 which is the mirror image of the shoulder 36' and is defined by corresponding surfaces including a radial end surface 78 identical to the previously described end surface 38'.

The elastomer 80 is formed of a rubber dielectric material and includes identical wing portions 82 extending from a base portion 84. A homogenous radial separation elastomer portion 86 extends inwardly from the base 84 separating the surfaces 38' and 78.

A clamping band encircles the shoulders 36' and 76 and the elastomer 80 and consists of semicircular portions 88 and 90 each of which include radially extending ears 92 through which the clamping bolts 94, extend, FIG. 4.

The assembly of the fitting 68 will be readily appreciated. Upon the shoulders 36' and 76 being related in an opposed relationship and the elastomer 80 located upon the shoulders, the clamp portions 88 and 90 are placed upon the elastomer and tightly clamped together by bolts 94. Prior to tightening the bolts 94 the flange 70 may be rotated about its axis to the desired rotational position with respect to body 12' and upon tightening the bolts 94 a high strength mechanical interconnection between the attachment end 30 and the mounting flange 70 is achieved. As the dielectric elastomer 80 insulates the attachment end 30' from the mounting flange 70, and likewise insulates the clamp relative to the other fitting components, this embodiment of the invention, likewise, forms an effective barrier against galvanic conduction and corrosion.

Figure 5:
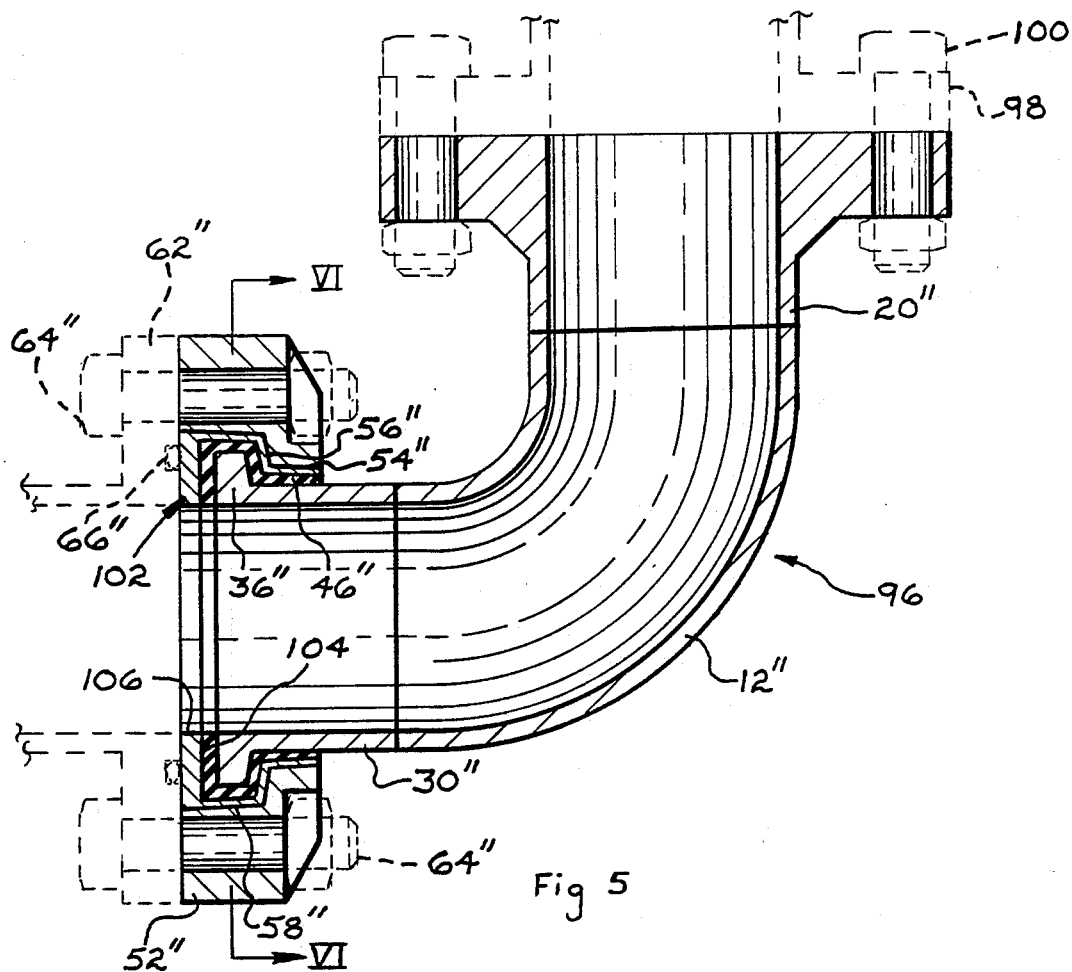
FIG. 5 is an elevational, diametrical sectional view of a galvanic isolator conduit fitting embodiment incorporating the invention wherein rotative adjustment between a fitting attachment end and the fitting body may be made.
Figure 6:
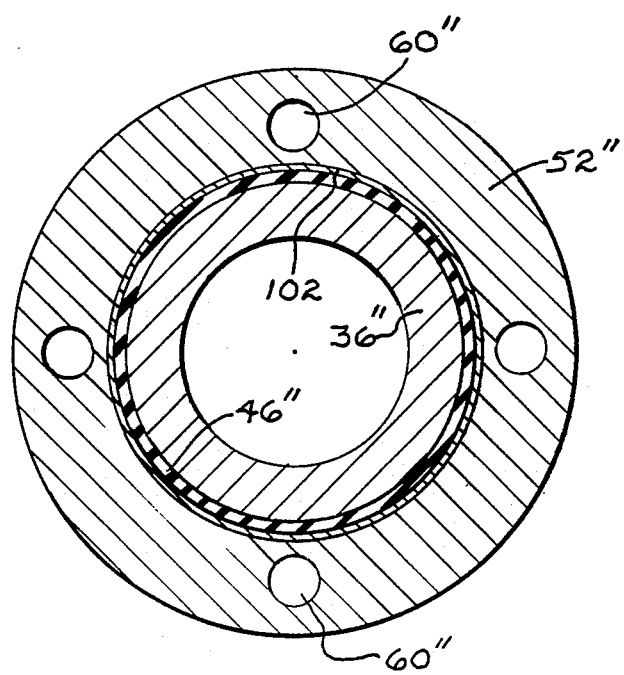
FIG. 6 is an elevational sectional taken along Section VI—VI of FIG. 5.
Figure 7:
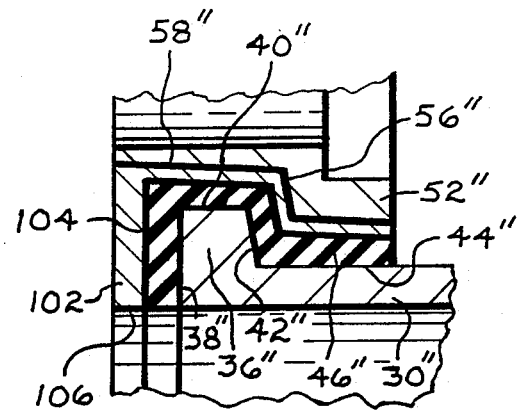
FIG. 7 is an enlarged, detailed, sectional view of the embodiment of FIG. 5 illustrating the configuration of the attachment shoulder, elastomer and bearing.

A third version of a fitting incorporating the inventive concepts is shown in FIGS. 5–7. In this embodiment components similar to those previously described are indicated by double primed reference numerals.

The fitting 96 includes an elbow configuration body 12" upon which the attachment end 20" is welded. In FIG. 5 a flanged component of the associated conduit system is represented in dotted lines comprising the flange 98 wherein bolts 100 attach the flange 98 to the attachment end 20". It will be appreciated that a similar flange would normally be associated with the attachment end 20 and 20' of the previously described embodiments.

The other end of the fitting includes the attachment end 30" having the previously described shoulder 36" extending therefrom which is encompassed by the elastomer 46" bonded thereto as described with respect to FIG. 1. A metal bearing 102 is bonded to the elastomer and is of a configuration which will be readily appreciated from FIGS. 5–7. The bearing 102 is formed of metal and completely encompasses the elastomer 46" and is bonded thereto. The radial portion of the bearing is defined by surface 104 which is bonded to the radial surface of the elastomer, and the bearing includes a bore 106 in alignment with the bore of the attachment end 30". A mounting flange 62" of the adjacent conduit fitting is shown in dotted lines and bolts 64" interconnect the mounting flange 52" to the flange 62".

The recess defined in the mounting flange 52" which receives the shoulder 36", the elastomer 46" and the bearing 102 as defined by the surfaces 54", 56" and 58" are slightly larger in diameter than the outer dimensions of the bearing 102 whereby reception of the bearing within the mounting flange recess permits rotation of the mounting flange on the bearing and the attachment end 30". Thus, the mounting flange 52" may be rotatably positioned on the attachment end 30" prior to tightening of the bolts 64". This rotation permits proper alignment of the mounting flanges interconnected by the bolts.

It will be appreciated that the embodiment of FIGS. 5–7 effectively establishes insulation between the mounting flange 52" and the other fitting components 12", 20" and 30", and this embodiment also galvanically isolates the conduit fittings associated with mounting flange 62" from those attached to the flange 98.

As with the previously described embodiments, the components shown in FIGS. 5-7 are assembled in such a way that they constitute a unit and the bearing 102 cannot separate from the elastomer 46", nor can the elastomer separate from the shoulder 36". The presence of the shoulder surface 42' and the mounting flange recess surface 56" limits axial movement of the mounting flange 52" to the left, FIG. 5, and the fitting components cannot be separated from each other and the entire fitting can be shipped, packaged and inventoried as a single unit.

It is appreciated that various modifications to the inventive concepts may be apparent to those skilled in the art without departing from the spirit and scope of the invention.

We claim:

1. A conduit fitting characterized by its standard configuration, galvanic isolation and unitary construction comprising, in combination, a metal conduit fitting having a body, first and second ends defined on said body and a passage defined in said body intersecting said ends, a radially extending shoulder defined on one of said body ends having a periphery and inner and outer radial faces, a homogeneous one-piece dielectric galvanic insulation sleeve engaging said shoulder periphery, faces and the conduit adjacent said shoulder, an annular mounting flange mounted on said shoulder encompassing said shoulder and conduit adjacent said shoulder and an annular radial face plate mounted in opposed relation to said shoulder outer face, said insulation sleeve being located between said mounting flange and shoulder faces and periphery and between said face plate and said should outer face whereby said flange and conduit are galvanically insulated from each other and comprise a unitary assembly.

2. In a conduit fitting as in claim 1, said galvanic insulator sleeve being bonded to said shoulder, an annular bearing including said face plate bonded to said insulator sleeve, said bearing being rotatably received within said mounting flange whereby said conduit shoulder and mounting flange may be rotatably adjusted with respect to each other.

3. In a conduit fitting as in claim 1, said galvanic insulator sleeve being formed of a dielectric elastomer.

* * * * *